United States Patent Office.

LUCIAN B. CRAM, OF WEATHERSFIELD, VERMONT.

Letters Patent No. 63,995, dated April 23, 1867.

IMPROVED LINIMENT.

*The Schedule referred to in these Letters Patent and making part of the same.*

TO WHOM IT MAY CONCERN:

Be it known that I, LUCIAN B. CRAM, of Weathersfield, in the county of Windsor, and State of Vermont, waiving and withdrawing my former specification under the foregoing petition signed by me, and dated January 14, 1867, do hereby present my new and amended specification as follows; that is to say, that I have invented, made, and applied to use a new and useful composition or mixture of simple substances, which, when compounded and prepared agreeably to my discovery, produces a most valuable liniment, (as in my said petition is alleged,) called "Cram's Compound Liniment," compounded and prepared as follows:

The ingredients of my said liniment are as follows: Oil of origanum, (*Oleum origani*,) spirits of ammonia, spirits of turpentine, alcohol. The proportion of each of the above ingredients required to produce my compound liniment is as follows: Oil of origanum, two parts, by measure; spirits of ammonia, two parts, by measure; spirits of turpentine, two parts, by measure; alcohol, three parts, by measure; or, of oil of origanum, spirits of ammonia, and spirits of turpentine, each equal parts, by measure, and of alcohol a sufficient quantity, by measure, to make one-third, by measure, of the whole quantity. When thus compounded and prepared the ingredients are to be thoroughly mixed together by being put into a vessel or bottle, or other like enclosure, and shaken until the different component parts have become thoroughly mixed and mingled together. When thus thoroughly mixed and mingled together, it should be put into bottles or vials, perfectly corked or otherwise closed to prevent evaporation and loss of strength.

I claim that my compound liniment, composed and prepared as above directed, will prove very efficacious in the treatment of, and in most instances will cure, the following-named diseases and complaints, to wit: Headache; nervous affections of the eyes; bronchitis; neuralgia, or ague in the face; toothache; sore throat, or irritation of the glands by taking cold; rheumatism; chilblains; flesh wounds; bruises and sprains of all kinds; diseases of the spine; *hydrops articuli*, or leakage of the joints; and bruises and sprains upon horses and other animals.

The directions for using my compound liniment are as follows:

For headache, or nervous affections of the eyes, &c.: Bathe the temples and forehead with the liniment and rub it in thoroughly with the hand, and at the same time snuffing at the nose profusely the odor of the liniment from the bottle or other vessel.

For toothache: Bathe the face upon the outside, and rub thoroughly with the hand.

For flesh wounds: Wet the wound slightly with the liniment, bathing the parts around the wound, and rubbing slightly with the hand.

For rheumatism, sprains, or bruises: Bathe the parts affected with the liniment, and rub at the same time thoroughly with the hand.

For all wounds, sprains, and bruises upon animals: Use the liniment as upon persons, but using thrice the quantity, and at the same time rub thoroughly with the hand or otherwise the parts affected.

I claim to be the original inventor and discoverer of the above-described medicine, specific, or liniment thus compounded, and that the said compound is new and original, and that it has never been used or known previous to my discovery as thus compounded, in this or any other country, to the best of my knowledge and belief.

I do not claim the discovery or the use in medicine of either of the above-named simple ingredients, separately, or the use or discovery of either one of the above-named simple ingredients in combination with either one of them; but I do claim as new and original—

The combination of the four above-named simple ingredients, in the proportions of each, or substantially in the proportions of each, above stated, for the uses and purposes above mentioned as a new and valuable preparation for the treatment and cure of diseases and injuries, as above set forth.

In testimony that the foregoing is a true specification of my said invention or discovery, and the beneficial uses to which the same may be applied, I have hereunto set my hand and seal this fifteenth day of February, in the year of our Lord one thousand eight hundred and sixty-seven.

LUCIAN BONEPARTE CRAM. [L. S.]

Witnesses:
JABEZ HAMMOND,
ADALINE HAMMOND.